Oct. 12, 1965    J. A. PERHAM    3,210,892
SAFETY WHEEL ASSEMBLY
Filed Oct. 30, 1963
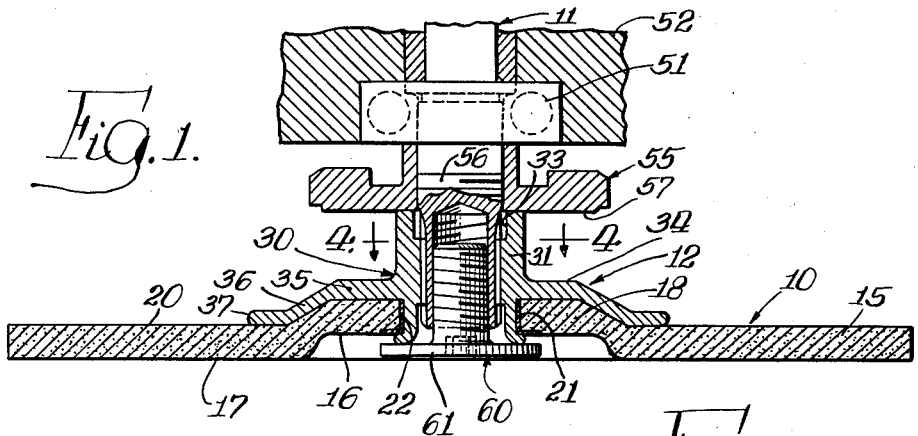
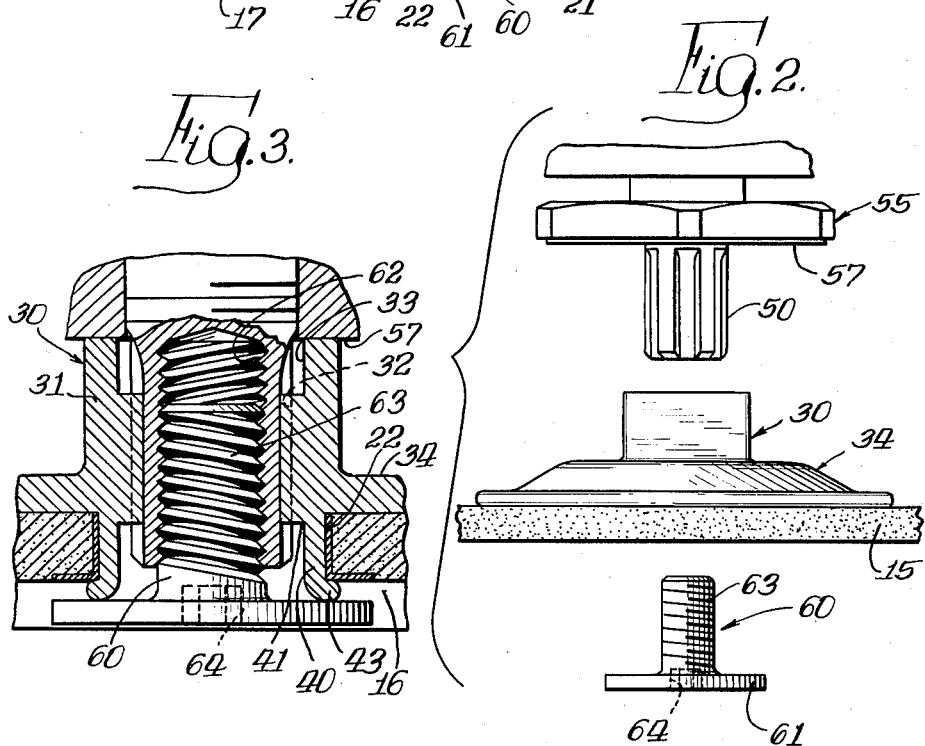
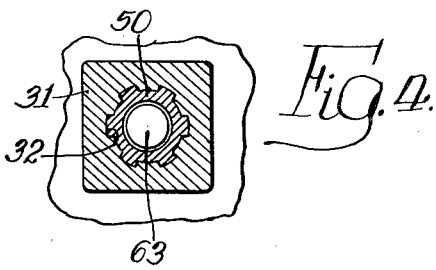
INVENTOR.
James A. Perham
BY
Horton, Davis, Breuer & Bugman
Attys.

United States Patent Office 3,210,892
Patented Oct. 12, 1965

3,210,892
SAFETY WHEEL ASSEMBLY
James A. Perham, Sioux City, Iowa, assignor to Albertson & Company, Inc., Sioux City, Iowa, a corporation of Iowa
Filed Oct. 30, 1963, Ser. No. 320,174
7 Claims. (Cl. 51—168)

This invention relates generally to rotatably driven members, particularly wheels and the like, and improved safety means for mounting the same on a driving spindle or shaft.

The use of rotatably driven grinding or abrasive wheels, buffer wheels, burring devices, power take-off wheels and similar members mounted on drive shafts is widespread and familiar in our industrial society. One of the more serious problems encountered in the use of all such devices resides in the provision of effective means for preventing undesired or accidental disassociation of the rotatably driven member, such as a grinding wheel, from the shaft, spindle or other rotatable drive means on which it is mounted. This problem is particularly acute when the connection between the driven wheel or member and its driving shaft or spindle is intentionally detachable to facilitate quick removal and replacement of the driven member. Into this category fall a host of power hand tools, for example, portable powered grinders wherein the abrasive wheels employed are intentionally detachable from the power driven shaft so that they may be readily replaced. While safety guards and similar devices have been used about the rotating wheel in an attempt to protect operating personnel in the event the wheel breaks or flies off of its shaft, such devices are not effective to prevent the detachment of the wheel from its driving spindle during operation. As a consequence, such tools are recognizedly dangerous to use, particularly since the rotatably driven member, such as a grinding or buffing wheel, is normally threaded onto the motor driven spindle and held there by a lock nut or similar device. Any sudden stoppage of the motor or source of driving power for the spindle due to breakdown of parts, freezing of motor bearings, etc., can cause the wheel to rotate relative to its driving spindle to unthread the lock nut and spin off or fly off of the spindle. Such an occasion can be very dangerous both to the tool operator and to others in the surrounding area.

The present invention is directed to improved means for overcoming the above-described difficulty and while the same will hereinafter be described in conjunction with its application to grinding wheels, it will be understood and recognized by those familiar with the art that it is readily and generally applicable to other classes of rotatably driven wheels or members which are detachably joined to rotatable driving spindles or shafts.

In brief, the present invention comprises a wheel structure having a new and improved hub assembly for mounting the same on a rotatable drive shaft. The new hub assembly is positively locked to the wheel or rotatably driven member and includes means for positively locking the same to the drive spindle to prevent relative rotation therebetween. The latter means comprises interfering surfaces on the wheel hub and drive spindle, preferably as afforded by a splined hub opening having lands and grooves receptive of a mating splined end portion of the drive shaft or spindle on which the hub is mounted. Such a connection means effectively prevents relative rotation between the shaft and the driven wheel member. A suitable locking means to prevent axial disassociation of the wheel hub and drive shaft is also included. The locking means last referred to comprises a threaded retaining bolt, preferably having a left-hand thread, received in a suitable threaded axial opening formed inwardly of the outer end of a clockwise rotatably driven drive spindle member. The bolt has an enlarged head portion which is of sufficient diameter to engage one end of the hub assembly and extend radially therepast to underlay a portion of the wheel member. This arrangement effectively prevents axial removal or disassociation of the hub assembly from the spindle and, more importantly, prevents axial disassociation of the wheel member from the hub and spindle in the event the wheel member should break loose from the hub assembly and rotate relative thereto, as might occur if the spindle were suddenly stopped. In such an event, rotation of the wheel relative to the spindle accompanied by engagement between the wheel member and the enlarged head portion of the retaining bolt would rotate the latter to tighten or threadingly advance the bolt toward the hub, wheel and spindle.

The main object of the present invention is to provide a new and improved safety assembly for positively coupling rotatably driven members to a rotatable drive means therefor.

Still an other object of the present invention is to provide a new and improved safety assembly for mounting rotatably driven wheels comprising an improved hub assembly for removably mounting a wheel on a shaft which includes means for effecting positive connection between the hub assembly and shaft to prevent relative rotation therebetween and additional removable connective means for preventing axial disassociation thereof.

Still another object of this invention is to provide a new and improved wheel assembly having improved hub means for mounting the same on a drive shaft and additional means effective to prevent axial disconnection between the wheel and shaft in the event that the wheel becomes detached from the hub means and the shaft is suddenly arrested during rotational operation thereof.

Still another important object of this invention is to provide a new and improved hub structure and connective means for detachably joining rotatably driven members to rotating drive shafts so as to substantially prevent accidental, relative axial and rotational movement therebetween.

Having thus described the present invention, the best mode presently contemplated for enabling one skilled in the art to make and use the same shall now be set forth in the following description of a preferred embodiment thereof illustrated in the accompanying drawings.

In the drawings:

FIGURE 1 is a front elevational view, wtih portions thereof in cross-section, illustrating a grinding wheel mounted on a drive spindle according to the present invention;

FIGURE 2 is an exploded view in front elevation showing portions of the assembly set out in FIGURE 1, but at an enlarged scale thereover, to illustrate the relationship of the drive spindle, hub assembly and retaining bolt members preparatory to their assembly;

FIGURE 3 is a partial cross-sectional showing of the assembly set out in FIGURE 1 and illustrating, at an enlarged scale thereover, the assembled relationship of the improved hub assembly, drive spindle and retaining bolt employed therein; and FIGURE 4 is a cross-sectional view taken substantially at line 4—4 of FIGURE 1 and looking in the direction of the arrows thereon to show the splined interconnection means employed between the drive spindle and hub assembly according to this invention.

Referring now to FIGURE 1 of the drawings, a wheel member 10 is therein shown detachably mounted on one end of a drive spindle 11 by means of an improved hub assembly 12, all according to this invention.

For purposes of the present description, the wheel 10 may constitute, as shown, a depressed center, abrasive wheel having a main body 15 formed as a circular disc provided with a central circular depression 16 formed inwardly of the bottom working face 17 thereof. The provision of the depressed area 16 results in a corresponding raised platform section 18 extending outwardly of the upper or opposite face 20 of the wheel body. Typically, abrasive wheels of this character are constructed of a combination of Fiberglas mesh impregnated with a mixture of abrasive materials, such as aluminum oxide or silicone carbide, all held together by suitable bonding agents, according to known practice. Such wheels are susceptible to being molded for producing the depressed center configuration, as illustrated, but with hardening of the bonding agent, the wheel body becomes substantially inflexible and rigid.

In order to adapt such a wheel for mounting on the spindle 11 or other drive means therefor, the body portion 15 thereof is provided with a central circular opening 21 which is preferably reinforced by an annular metal liner 22 (see FIGURE 3) fixed in place and bonded to the body portion 15 in the course of manufacturing the wheel.

According to the present invention, the wheel body 15 is fixed to the hub assembly 12 in a manner suitable to prevent relative movement between the wheel body and hub assembly. To this end and with particular reference to FIGURES 1 and 3 of the drawings, the hub assembly 12 comprises a throw-away, unitary metal casting formulating a unitary hub member 30 which is attached to the wheel member 10 in such a manner as to substantially prevent its removal therefrom; it being intended that the hub and wheel be permanently assembled together as a unit. This arrangement avoids the possibility of erroneously assembling the hub member with other wheel members as would be possible if such members were detachably associated.

In brief, the hub member 30 is preferably made as a unitary member, as by centrifugal casting or similar processes, to provide a central, axially extending body portion 31 of substantially square cross section (see FIGURE 4) which is distinguished by a central bore, such as the splined bore 32 shown, extending axially therethrough and having plural interfering locking surfaces formed therealong. The upper end of bore 32 is surrounded by a cylindrical counterbore 33 which terminates the splined formation thereof at one end, inwardly of the upper end of the hub body portion. An annular flange portion 34 is also formed integrally with body portion 31 to project radially outwardly thereof intermediate its axial ends; said flange portion, in the particular embodiment illustrated, including an annular planar platform section 35 immediately adjacent the body portion 31, an annular skirt portion 36 extending angularly outwardly and downwardly from the platform portion 35, and a radially outermost annular lip portion 37 comprising the outer extremity of the flange portion 34.

This flange configuration is formulated, as seen particularly in FIGURE 1, to adapt the flange portion to close-fitting reception of the centrally raised section 18 of the wheel member, resulting from the particular depressed center configuration, as above described. In this respect, it will be understood that the flange portion 34 of the hub member may be configured other than as illustrated in FIGURE 1, as, for example, in a planar disc formation to accommodate flat wheels as opposed to the depressed center wheel illustrated. In any event, it is intended that the lower face of the flange portion 34 be in close-contacting engagement with the upper face 20 of the wheel member over a substantially central area immediately surrounding and adjacent to the central opening 21 of the wheel. If desired, a suitable bonding agent may be employed between the opposing engaging faces of the wheel and hub flange portion to assist in affixing the hub member to the wheel.

Formed immediately below and integrally with the flange portion 34 is a depending annular pilot wall portion 40 (see FIGURE 3) which skirts the lower end of the splined bore 32 in the hub body. Wall 40 is defined radially outwardly of such splined bore, being separated therefrom by a cylindrical shoulder indicated at 41 in FIGURE 3, in particular.

In assembly, the annular wall portion 40 is piloted into and thrust coaxially through the central opening 21 of the wheel, and in close-fitting contact and engagement with the reinforcing member 22 therein. This brings the upper wall or face 20 of the wheel member, particularly the raised central section 18 thereof, into close-fitting engagement with the lower face of the hub flange portion 34, substantially as illustrated in FIGURES 1 and 3 of the drawings. The annular wall portion 40 is purposely of greater axial extent or length than the thickness of the wheel body 15, thereby providing a bead or lip portion 43 projecting into the central depressed cavity 16 of the wheel or, in the case of a flat wheel, past the lower face thereof. This bead or lip portion is spun over in a radial outward direction in final assembly to tightly lock and permanently affix the hub member to the wheel.

As previously mentioned and as will be readily recognized from FIGURE 2 especially, the assembled wheel and hub members are adapted to be attached to the driving spindle 11 by inserting the splined end portion 50 of the spindle 11 into the central splined opening 32 of the hub member. The spindle member 11, as indicated in FIGURE 1, is rotatably supported in bearings 51 carried in a housing 52 associated with a portable grinding tool or other class of power tool, such as a drill press, for example. Preferably a drive collar 55 is mounted on the spindle 11 and attached thereto by threading engagement with a threaded portion 56 on the drive spindle immediately adjacent the externally splined end portion 50 thereof. As illustrated in FIGURES 1 and 2, the drive collar is thus normally disposed between the splined portion 50 of the spindle and the supporting bearing assembly 51 therefor.

When the hub member of the above-described wheel assembly is fitted onto the splined portion of the drive spindle 11, the upper or axially outermost end of the hub body portion 31 intentionally engages the lower face 57 of the drive collar. This properly locates the wheel assembly in correct operating relationship with the spindle. To insure against axial removal or movement of the wheel assembly relative to the driving spindle, the hub assembly 12 includes a retaining bolt 60 having an enlarged circular head portion 61. This bolt is threadingly received in a threaded bore 62 formed axially inwardly of the outer splined end of the spindle 11, with such head portion lying wholly within the central depression 16 of the wheel 10 in the partial embodiment illustrated in FIGURE 1. It also will be appreciated that the threaded bore 62 and the mating threaded portion 63 of the bolt member are shown as comprising left-hand threads; it being contemplated in the assembly shown that the left-hand threads will serve to advance the bolt 60 into bore 62 by rotating the bolt in the same rotational direction imparted to the driven wheel 10. The provision of the enlarged head portion 61 on the holding bolt also enables that bolt to engage the turned-over bead portion 43 of the hub member when the bolt is appropriately tightened into the threaded bore 62 of the spindle. This serves to urge the wheel assembly axially toward the drive collar 55 to hold the upper end of the hub body tightly against the underface 57 of the drive collar, thereby preventing axial movement of the hub member relative to the spindle 11. To assist in mounting the retaining bolt 60 in the spindle member, as above described, a hexagonal socket 64 receptive of an appropriate wrench or drive tool is preferably provided in the head portion 61 of the retaining bolt, as shown best in FIGURES 2 and 3.

It will be understood from the foregoing description that when the interfering surfaces, as provided by the splined end portion 50 of the shaft member 11, are matingly engaged with the cooperating surfaces in the bore of the hub member, a substantially positive interconnection between the hub and spindle is afforded which all but eliminates possible relative rotational movement therebetween. Undesired axial disassociation of the hub and spindle is also substantially eliminated by provision of the retaining bolt which serves to axially lock the hub on the spindle, as above described.

It is recognized, however, that the connection means fixing the wheel member to the hub member might disrupt or loosen under certain adverse operating conditions, as, for instance, when the spindle is abruptly arrested or stopped while driving the wheel at a relatively high r.p.m. In such an eventuality the wheel member might rotate relative to or about the hub and tend to wear off the spun-over retaining bead portion 43 holding the wheel to the hub member. In that event, however, the enlarged head portion 61 of the retaining bolt is intentionally provided with a radial extent greater than the central opening of the wheel. This relationship is particularly set out in FIGURE 3 of the drawings. Thus, if for some reason the wheel member should become disconnected from the hub member during rotational operation, axial movement of the wheel away from the hub would cause the wheel member to engage the enlarged head portion of the retaining bolt to prevent its complete axial disconnection from the hub member. Further, due to the provision of the left-hand threads on the retaining bolt, any such engagement thereof by the rotating wheel serves to tighten the retaining bolt and advance the same toward the spindle to thus further restrain the wheel member against axial movement away from the hub and spindle. This is also true with respect to the hub member, if such should somehow rotate relative to the spindle during tool operation.

From the foregoing it is believed that those familiar with the art will readily recognize and understand the unique features of the present invention which serve to distinguish the same over previous devices of this class. It also will be understood that while the present invention has hereinabove been described with reference to a particular embodiment thereof illustrated in the accompanying drawings, the same is susceptible to wide variation, modification and substitution of equivalents without departing from its inventive spirit and scope. Consequently, it is intended that the present invention be unlimited by the foregoing specification and description thereof, except as may appear in the following appended claims.

I claim:

1. For use with a rotatably driven shaft having an end portion formed with plural interferingly related surfaces, an improved safety assembly for detachably connecting a member to the shaft for conjoint rotation therewith comprising, a unitary metal hub having an axial bore formed with plural interfering surfaces matingly receptive of and engageable with the surfaces on the end portion of the shaft, a radially extending flange portion formed on said hub intermediate the ends thereof, a member to be driven by the shaft mounted coaxially about and on said hub in abutting engagement with said flange portion thereof, means fixing said hub to said member to be driven so as to insure conjoint rotation thereof and substantially prevent axial disassociation thereof, and detachable means selectively removable and adapted to prevent axial disassociation of the said hub and member from the shaft comprising a retaining bolt threadingly engageable with a threaded bore formed axially inwardly of the end portion of the shaft and having an enlarged head portion at one end thereof, said head portion extending radially outwardly of the end portion of the shaft and radially beyond an adjacent one end of said hub when the assembly is mounted on the shaft to thereby prevent axial removal of the hub and member therefrom.

2. In a power-driven tool adapted to rotatably drive a work-engaging wheel member and the like, the combination comprising a rotatably driven spindle member having an externally splined end portion adapted to mount a wheel member to be rotatably driven, said end portion also having a threaded bore extending axially inwardly from the outer end thereof; a metal hub member having an axial body portion formed with a central splined bore opening inwardly of one end thereof and extending axially through said body portion, said splined bore being receptive of said splined end portion of said spindle member; an annular retaining wall portion extending axially outwardly of the other end of said body portion, an annular flange portion extending radially outwardly of said body portion intermediate said one end thereof and said annular wall portion, a wheel member having a central opening closely receptive of said annular wall with the latter being a greater axial extent than the thickness of said wheel member so as to provide an annular bead portion projecting beyond one end face of said wheel member, said bead portion being deformed radially outwardly past the periphery of said opening and engaged with said one end face of said wheel member to thereby lock the latter on said hub member with the opposite end face thereof tightly pressed against said flange portion; a retaining bolt member having an externally threaded portion adapted to be threadingly received in the said threaded bore of said spindle member, and an enlarged head portion formed on said bolt member and adapted to extend radially outwardly of said bead portion and the periphery of said opening to thereby underlap said bead portion and said one end face of said wheel for preventing axial disassociation of said hub and wheel members from said spindle.

3. The combination as set forth in claim 2 wherein said threaded bore and said threaded portion of said retaining bolt are formed appropriately to effectuate axial advancement of said bolt member toward said spindle member when said bolt member is rotated in the same direction in which said spindle member is rotatably driven.

4. The combination as set forth in claim 2 wherein said retaining bolt member is provided with a tool-engageable socket means formed in said head portion thereof whereby said bolt member may be engaged and threadingly advanced into said threaded bore.

5. For use in power tools having a power-driven spindle on which members to be rotatably driven thereby are detachably mounted, an improved safety wheel assembly comprising a unitary metal hub member having a body portion formed with a splined bore extending axially therethrough, said bore being matingly receptive of a splined end portion of the power-driven spindle whereby the latter and said hub member are interlocked for conjoint rotation, an annular flange portion formed on said body portion and extending radially outwardly therefrom, an annular retaining wall portion formed axially outwardly of one end of said body portion, a work-engaging wheel member having a central opening therethrough mounted on said hub member with the said annular wall portion of the latter extending through said central opening and with one end face of said wheel member abuttingly engaging said annular flange portion; said annular wall member having a deformed portion extending axially beyond the opposite end face of said wheel member and radially outwardly of the periphery of said central opening therein, such deformed portion serving to axially lock said wheel member on said hub member and to press the said one face of said wheel member tightly against said flange portion to unify said members, and a retaining bolt member having an enlarged head portion at one end thereof adapted to be threadingly mounted in a threaded bore formed axially inwardly of said splined end portion of the spindle, the said enlarged head portion thereof extending radially past and engaging the said deformed portion of said annular wall portion and also extending radially beyond the periphery of the said central opening in said wheel member so as to prevent axial disassociation of said hub and wheel members from the spindle member.

6. The combination as set forth in claim 5 wherein said wheel member comprises an abrasive disc having a depressed central area in the said one end face thereof, said enlarged head portion of said retaining bolt member being normally disposed within said depressed area and axially inwardly of said one end face when the wheel assembly is attached to the spindle.

7. The combination as set forth in claim 5 wherein said bolt member is adapted to be threadingly advanced into the bore of the spindle member by rotational movement thereof in the same direction as that imparted to said hub and wheel members whereby and disassociation of the said wheel, hub and spindle members sufficient to permit relative rotational movement between such members will cause said bolt member to be tightened and advanced toward said spindle member when said head portion thereof is engaged by the rotating wheel or hub members.

References Cited by the Examiner
UNITED STATES PATENTS

| | | | |
|---|---|---|---|
| 872,932 | 12/07 | Hall | 51—168 |
| 1,162,970 | 12/15 | Benford | 51—168 X |

LESTER M. SWINGLE, *Primary Examiner.*

UNITED STATES PATENT OFFICE
CERTIFICATE OF CORRECTION

Patent No. 3,210,892                          October 12, 1965

James A. Perham

It is hereby certified that error appears in the above numbered patent requiring correction and that the said Letters Patent should read as corrected below.

Column 2, line 50, for "wtih" read -- with --; column 8, line 1, for "and", second occurrence, read -- any --.

Signed and sealed this 31st day of May 1966.

(SEAL)
Attest:

ERNEST W. SWIDER
Attesting Officer

EDWARD J. BRENNER
Commissioner of Patents